(12) United States Patent
Robinson

(10) Patent No.: US 8,020,655 B2
(45) Date of Patent: Sep. 20, 2011

(54) VARIABLE PITCH RADIATOR FAN CONTROL SYSTEM

(75) Inventor: James S. Robinson, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 431 days.

(21) Appl. No.: 12/198,582

(22) Filed: Aug. 26, 2008

(65) Prior Publication Data

US 2009/0057043 A1    Mar. 5, 2009

Related U.S. Application Data

(60) Provisional application No. 60/969,829, filed on Sep. 4, 2007.

(51) Int. Cl.
*B60K 11/06* (2006.01)

(52) U.S. Cl. ........... 180/68.1; 416/38; 416/39; 180/68.4

(58) Field of Classification Search ............... 180/68.1, 180/68.4; 123/43.12, 4, 41.49; 416/38, 39, 416/143, 151, 155, 162, 168 R; *B60K 11/06*
See application file for complete search history.

(56) References Cited

U.S. PATENT DOCUMENTS

| | | | |
|---|---|---|---|
| 2,208,602 A | 7/1940 | Ruths et al. | |
| 2,679,299 A | 5/1954 | Kelson, Sr. | |
| 2,711,796 A | 6/1955 | Amiot | |
| 3,092,186 A | 6/1963 | MacLean | |
| 3,098,184 A | 7/1963 | Deriaz | |
| 3,138,136 A | 6/1964 | Nichols | |
| 3,967,916 A | 7/1976 | Chittom | |
| 4,458,888 A * | 7/1984 | Wolf et al. | 267/140.12 |
| 4,534,524 A | 8/1985 | Aldrich | |
| 4,671,737 A | 6/1987 | Whitehouse | |
| 4,772,182 A | 9/1988 | Witte | |
| 5,102,301 A | 4/1992 | Morrison | |
| 5,122,034 A | 6/1992 | Isert | |
| 5,205,712 A | 4/1993 | Hamilton | |
| 5,281,094 A | 1/1994 | McCarty et al. | |
| 5,451,141 A | 9/1995 | Carvalho et al. | |
| 6,253,716 B1 | 7/2001 | Palmer et al. | |
| 6,439,850 B1 * | 8/2002 | McCallum et al. | 416/144 |

(Continued)

FOREIGN PATENT DOCUMENTS

GB    2168435    6/1986

OTHER PUBLICATIONS

U.S. Appl. No. 12/198,593, filed Aug. 26, 2008.

*Primary Examiner* — J. Allen Shriver, II
*Assistant Examiner* — James Triggs
(74) *Attorney, Agent, or Firm* — Plumsea Law Group, LLC; Mark E. Duell

(57) ABSTRACT

A control system for a variable pitch radiator fan is disclosed. The control system is capable of varying the blade pitch of the radiator fan from a normal position to a full reverse position. The control system can change the blade pitch based on a number of factors, including vehicle speed. In systems with a plurality of fans, the control system is also capable of independently controlling the blade pitch of each of the fans. In systems with multiple fans, the control system can produce a circulation mode.

20 Claims, 6 Drawing Sheets

U.S. PATENT DOCUMENTS

| | | |
|---|---|---|
| 6,564,899 B1 | 5/2003 | Arian et al. |
| 6,644,922 B2 | 11/2003 | McCallum et al. |
| 6,659,894 B2 | 12/2003 | Kern et al. |
| 6,729,844 B2 | 5/2004 | Bettencourt |
| 6,896,564 B2 | 5/2005 | Willmot |
| 6,933,687 B2 * | 8/2005 | Makaran et al. ............... 318/34 |
| 7,121,368 B2 * | 10/2006 | MacKelvie ................. 180/68.1 |
| 7,568,888 B2 * | 8/2009 | Castillo ........................ 416/143 |
| 2007/0262584 A1 * | 11/2007 | Lu .................................. 290/55 |

* cited by examiner

VARIABLE PITCH RADIATOR FAN CONTROL SYSTEM

CROSS-REFERENCE TO RELATED APPLICATION

This application claims priority under 35 U.S.C. §119(e) to U.S. Provisional Patent Application No. 60/969,829, entitled "Variable Pitch Radiator Fan Control System and Pitch Change Mechanism", and filed on Sep. 4, 2007, which application is hereby incorporated by reference.

BACKGROUND OF THE INVENTION

The present invention relates generally to variable pitch radiator fans, and in particular to a control system for a variable pitch radiator fan.

Variable pitch radiator fans for use in motor vehicles have been proposed. U.S. Pat. No. 6,729,844 to Bettencourt and assigned to the inventor, is directed to a control system for a cooling fan with variable pitch blades. Electronic control device 10 operates variable pitch fan assembly 12. The '844 patent discloses a system and method for controlling variable pitch fan assembly 12 based on three parameters: (1) a temperature parameter, (2) a pressure parameter, and (3) a timing device. A switch is associated with each of these three parameters, and based in the position of the various switches, the pitch of the fan blades is adjusted.

The temperature parameter is coupled to the engine block. But Bettencourt also teaches other locations, such as an oil cooler, the engine radiator 24, a heat exchanger, an air conditioner condenser 104 or the air charge cooler 106. See column 7, lines 20-25. The pressure parameter is related to a change in pressure of the air conditioning system as measured by an air conditioner pressure switch. See column 6, lines 32-34, and column 7, lines 42-44. Bettencourt also discloses the use of a timer. The timer is used to change the blade pitch at predetermined intervals of time. See column 11, line 11 to column 12, line 41. In the example given in that portion of the specification, the timer is used to place the blades in the full neutral position (no airflow) for 20 minutes after the engine is started, and then after 20 minutes, enter a full purge mode (full reverse or push mode) for 8 seconds, and then return to the neutral position.

A system of relays, switches and solenoids are used to define the operating logic of the system. A summary of the operating logic is shown in FIG. 6. Basically, if the timer relay is closed, the blade pitch is set to full reverse. If the timer relay is open (not operating) the temperature and pressure switches govern the fan blade pitch position.

U.S. Pat. No. 6,659,894 to Kern and assigned to Generac Power Systems Inc., is directed to a variable pitch sheave assembly. The variable pitch sheave assembly is used to control the speed of a fan that is used to cool an engine driven electrical generator. In Kern, the term "variable pitch" is not used to describe the pitch of the propeller blades of the fan, but rather the pitch or spacing of a sheave pulley assembly. This sheave pulley system is shown in FIGS. 12 and 13. The variable pitch sheave assembly operates in a manner that is similar to most continuously variable transmissions (CVT). The sheaves move axially along a rod and their motion varies the gear ratio between two drive pulleys. By changing the gear ratio, current changes the fan speed. It is important to note that Kern does not change the pitch of the propeller blades. The Kern device is also not responsive to engine speed, water temperature, or intake air temperature.

U.S. Pat. No. 6,644,922 to McCallum et al. and assigned to Flexxaire Manufacturing, Inc., is directed to a variable pitch fan. The fan disclosed in McCallum can be used in combination with earth moving equipment including engines made by Caterpillar, Inc. See column 1, lines 16 and 17. McCallum teaches blades 14 of cooling fan 10 that have a plurality of blade positions, including a push position (reverse blade position), a pull position (conventional or normal position) where air is blown from the front of the vehicle towards the engine, and a neutral position in which the rotation of the blades continues but blocks air flow. The blades of McCallum's variable pitch fan can be adjusted in small increments from reverse to normal pitch position. McCallum also teaches the concept of sensing a number of variables to control or set the pitch of the blades. McCallum teaches sensing the following variables: conventional speed or RPM (revolutions per minute), engine coolant temperature, intake air temperature, hydraulic oil pressure, transmission oil temperature, brake coolant temperature, pressure or air conditioner condenser temperature, or any other sensor that indicates a cooling load.

McCallum, however, does not teach or render obvious the concept of changing the pitch of a fan in response to vehicle speed or motion including idle, forward motion or reverse motion. McCallum also does not teach the concept of using an independent fan speed. In McCallum, the fan is directly coupled to the engine and the fan speed is proportional to engine speed. See column 12, lines 61-67.

U.S. Pat. No. 6,253,716 to Palmer et al. and assigned to Horton, Inc., is directed to a control system for a cooling fan with variable pitch blades. The control system of Palmer is responsive to one or more operational parameters and a second signal related to a cooling requirement.

Palmer discloses several different embodiments. In one embodiment, the operational parameter is engine speed, and the cooling requirement is provided by Electronic Control Module (ECM) 205. The ECM includes a signal generator 225, and this signal generator provides a pulse width modulated signal to CPU 200. ECM 205 provides a cooling level, one example of which is a cooling level of 50%. See column 7, lines 44 to 58. In this first embodiment, CPU 200 uses the engine speed and the desired cooling level provided by ECM 205 to compute the blade angle. In a second embodiment, charge air intercooler temperature and engine coolant temperature are monitored, and the blade pitch is set based on these two conditions.

U.S. Pat. No. 6,564,899 to Na and assigned to Samsung Heavy Industry Co., Ltd., is directed to a control system for a cooling fan with variable pitch blades. Controller 30 is electrically connected to a sensor 20 disposed in a water conduit 13 that connects from the engine to radiator 8. A signal from sensor 20 is used to calculate the blade angle.

While the related art teaches various blade pitch control systems, the related art fails to teach a blade pitch control system that is responsive to a number of environmental or operating conditions including vehicle speed. The related art also fails to teach a control system capable of independently controlling two or more radiator fans. Finally, the related art fails to teach the concept of providing a circulation effect or mode where the blade pitch of two fans is opposed.

SUMMARY OF THE INVENTION

In one aspect, the invention provides a motor vehicle comprising: a chassis; a passenger portion configured to receive at least one passenger; an exterior surface; a radiator disposed proximate the exterior surface, and in between the exterior surface and a fan; the fan including a hub and at least one fan blade, the fan blade being variable pitch and capable of assuming a plurality of different pitch angles; a pitch change mechanism configured to control the angle of the fan blade; a control system in communication with the pitch change mechanism; and wherein the control system receives vehicle speed information related to vehicle speed, and uses the vehicle speed information to control the pitch change mechanism.

In another aspect, the control system includes an air temperature sensor configured to receive air temperature information, and wherein the pitch change mechanism is responsive to the air temperature information.

In another aspect, the air temperature sensor is disposed between the radiator and the exterior surface.

In another aspect, the air temperature sensor is disposed between the fan and a power plant of the motor vehicle.

In another aspect, the control system adjusts the pitch change mechanism to provide air flow from the fan and towards the radiator when a motor vehicle speed is approximately zero.

In another aspect, the control system adjusts the pitch change mechanism to change a direction of the air flow as vehicle speed increases.

In another aspect, the control system adjusts the pitch change mechanism to provide air flow from the radiator towards the fan as the motor vehicle speed increases.

In another aspect, a motor vehicle, comprising: a chassis; a passenger portion configured to receive at least one passenger; an exterior surface; a radiator disposed proximate the exterior surface, the radiator also being disposed between the exterior surface and a first fan and a second fan; the first fan aligning with a first portion of the radiator and the second fan aligning with a second portion of the radiator; a control system in communication with the first fan and the second fan; and where the control system can vary the blade pitch of the first fan and can also independently vary the blade pitch of the second fan.

In another aspect, the control system causes the blade pitch of the first fan to assume a position whereby air is pushed towards the radiator from the first fan, and the control system also causes the blade pitch of the second fan to assume a position whereby air is pulled from the radiator to the second fan, thus creating a circulation air flow.

In another aspect, the first fan and the second fan are disposed between the radiator and a power plant associated with the motor vehicle.

In another aspect, the control system receives vehicle speed information related to vehicle speed, and uses the vehicle speed information to control the blade pitch of the first fan.

In another aspect, the control system receives vehicle speed information related to vehicle speed, and uses the vehicle speed information to control the blade pitch of the second fan.

In another aspect, the control system receives vehicle speed information related to vehicle speed, and uses the vehicle speed information to control the blade pitch of the first fan to reverse an airflow direction and provide a flow of air from the radiator to the fan as the vehicle speed increases.

In another aspect, the first fan is laterally spaced from the second fan, wherein both the first fan and the second fan confront an inner surface of the radiator.

In another aspect, the invention provides a method for adjusting a pitch angle of a fan blade for use in conjunction with a radiator in a motor vehicle comprising the steps of: adjusting the pitch angle to provide a flow of air from a power plant associated with the motor vehicle to the radiator of the motor vehicle when temperature information received by a sensor is above a predetermined level; and adjusting the pitch angle to provide a flow of air from the radiator to the power plant of the motor vehicle when a speed of the motor vehicle increases.

In another aspect, the speed of the motor vehicle increases from zero to a forward speed.

In another aspect, an initial pitch angle is set to block air to the power plant when the temperature information is below a predetermined level.

In another aspect, the temperature information is related to coolant temperature.

In another aspect, the motor vehicle has a front engine configuration.

In another aspect, the method provides a step of independently adjusting a second pitch angle associated with a second fan.

In another aspect, the invention provides a method for adjusting a pitch angle of a fan blade for use in conjunction with a radiator in a motor vehicle comprising the steps of: adjusting the pitch angle to block a flow of air from the radiator to a power plant of the motor vehicle when temperature information received by a sensor is below a predetermined level; and adjusting the pitch angle to provide a flow of air from an exterior surface to the radiator when a speed of the motor vehicle increases.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
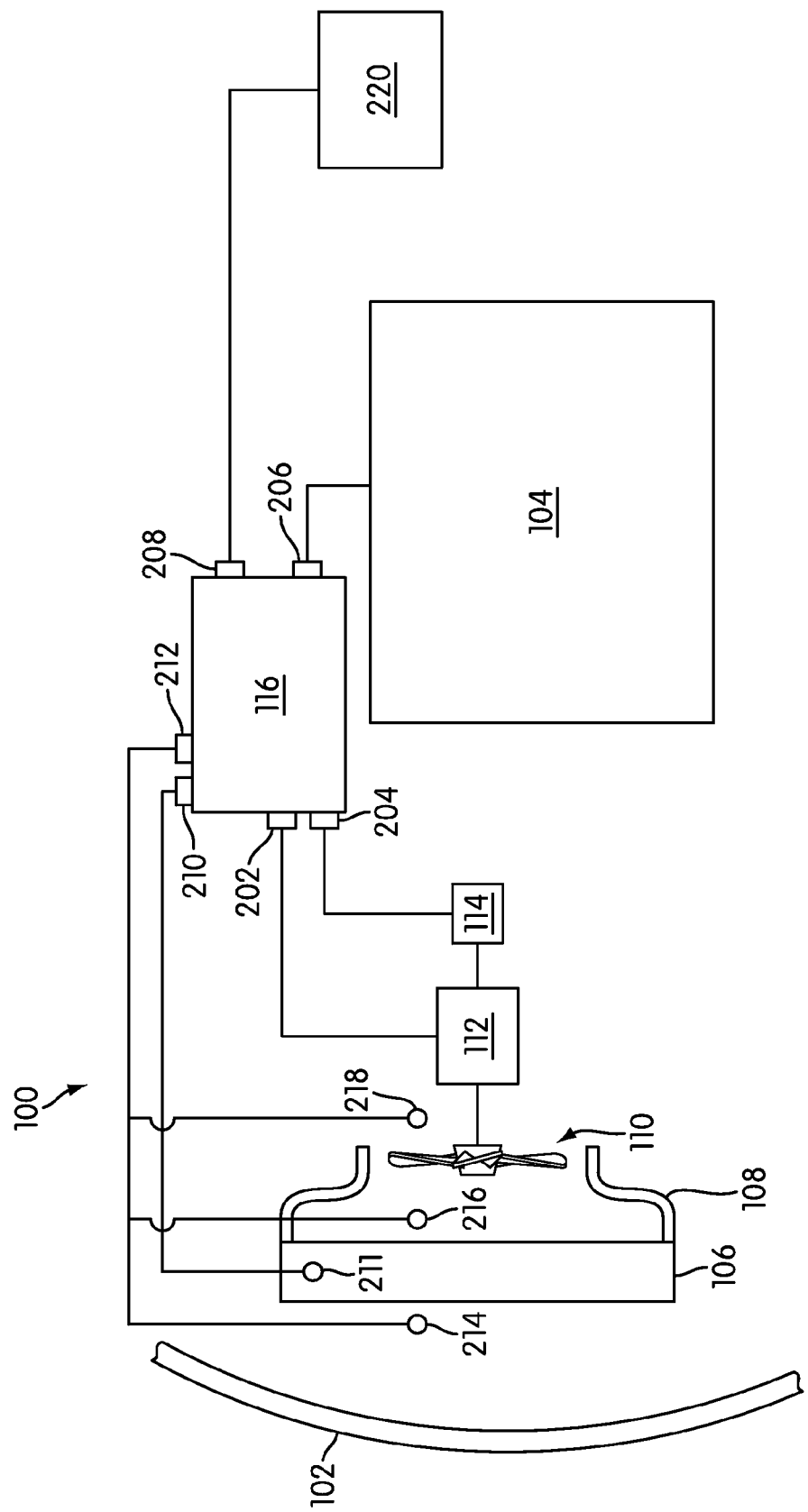
FIG. 1 is a schematic diagram of a preferred embodiment of a portion of a motor vehicle.

FIG. 100 is a schematic diagram of a portion 100 of a motor vehicle. The motor vehicle includes an exterior surface 102 and a power plant 104. Preferably, the motor vehicle includes provisions to cool or ventilate power plant 104. In the embodiment shown in FIG. 1, motor vehicle 100 includes radiator or heat exchanger 106 and fan 110 that can be used to force air across radiator 106. In some embodiments, an optional shroud or duct 108 is provided. Shroud 108 can help to increase the efficiency of fan 110. Fan 110 can be driven in a number of different ways. In some embodiments, fan 110 directly coupled to power plant 104. In these cases, fan 110 is driven by a fan belt, a serpentine belt, or some other accessory drive belt. In other embodiments, fan 110 is drive independently from power plant 104. In these embodiments, fan 110 includes fan drive 112. In a preferred embodiment, fan drive 112 is an electric motor.

Preferably, fan 110 includes at least one fan blade that can assume a number of different pitch positions. Preferably, all of the fan blades are variable pitch, and their range of motion can vary from full normal pitch where air is drawn from radiator 106 towards fan 110, to neutral pitch, to full reverse pitch, where air is pushed from fan 110 towards radiator 106. Preferably, a pitch change mechanism 114 associated with fan 110 helps to change the pitch of the fan blades.

In a preferred embodiment, control system 116 is provided. Control system 116 is preferably used to control fan drive 112 and/or pitch change mechanism 114 based on various information collected from one or more sensors. The following ports, sensors, or devices are all optional and may or may not be used with certain embodiments. Control system 116 preferably includes a number of ports. The term "port" means any interface or shared boundary between two conductors. In some cases, ports can facilitate the insertion and removal of conductors. Examples of these types of ports include mechanical connectors and/or electrical connectors. In other cases, ports are interfaces that generally do not provide easy insertion or removal. Examples of these types of ports include soldering or electron traces on circuit boards.

All of the following ports and provisions associated with control system 116 are optional. Some embodiments may include a certain port or provision, while others may exclude it. The following description discloses many of the possible parts and provisions that can be used, however, it should be kept in mind that not every part or provision must be used or included in a given embodiment. And it should be kept in mind that some embodiments may include every port or provision.

Control system 116 preferably includes a number of ports that are used to send information, instructions and/or a signal from control system 116 to various elements. In the embodiment shown in FIG. 1, control system 116 includes fan drive port 202 and pitch change mechanism port 204. Fan drive port 202 can be used by control system 116 to send a signal to fan drive 112. The signal can include instructions or information that instruct fan drive 112 to operate in a certain way. In some embodiments, control system 116 can send an instruction through fan drive port 202 to fan drive 112 to spin fan 110 at a certain desired speed. Control system 116 preferably also includes pitch change mechanism port 204. Preferably, pitch change mechanism port 204 is used by control system 116 to send a pitch signal to pitch change mechanism 114. The pitch signal is used by pitch change mechanism 114 to establish or set a pitch for the fan blades associated with fan 110.

Control system 116 can also include a number of ports that are used to receive a signal or information from various sensors. Control system 116 can optionally include engine speed port 206. Preferably engine speed port 206 communicates with power plant 104 and retrieves engine speed information. Engine speed port 206 generally receives engine speed information in the form of revolutions per minute of the crank shaft associated with power plant 104. Engine speed information can be derived in a number of different ways including interrogation of a crank angle sensor.

Control system 116 also optionally includes vehicle speed port 208. Preferably, vehicle speed port 208 communicates with vehicle speed sensor 220 to receive information related to vehicle speed. Preferably, both speed and direction can be received by vehicle speed port 208. Thus, control system 116 would be informed of the vehicle speed including zero vehicle speed when motor vehicle 100 is idling, reverse vehicle speed when motor vehicle is in reverse, and a forward vehicle speed when motor vehicle 100 is moving forward.

Control system 116 can also optionally include coolant temperature port 210. Preferably, coolant temperature port 210 preferably communicates with coolant temperature sensor 211. In the schematic diagram shown in FIG. 1, coolant temperature sensor 211 is disposed inside radiator 106. While this is one possibility, coolant temperature sensor 211 can be disposed anywhere within the coolant circuit. Another possible position of coolant temperature sensor 211 is on the inlet to radiator 106. Coolant temperature sensor 211 sends information related to the coolant temperature to coolant temperature port 210. Using coolant temperature port 210, control system 116 can determine the coolant temperature.

Control system 116 can also optionally include air temperature port 212. Air temperature port 212 preferably communicates with at least one air temperature sensor. The air temperature sensor can be disposed in a number of different locations. In one embodiment, air temperature sensor 214 is disposed between exterior surface 102 and radiator 106. In another embodiment, air temperature sensor 216 is disposed between radiator 106 and fan 110. In another embodiment, air temperature sensor 218 is disposed between fan 110 and power plant 104. The air temperature sensor can be deployed in any of these positions 214, 216 and/or 218. In some cases, more than one air temperature sensor is used and both temperature sensors communicate with air temperature port 212. Using air temperature port 212, control system 116 can determine the ambient air temperature at a number of different locations.

Preferably, control system 116 uses one or more signals or items of information received from one or more ports to determine the fan drive speed and the pitch of one or more fan blades.

Figure 2:
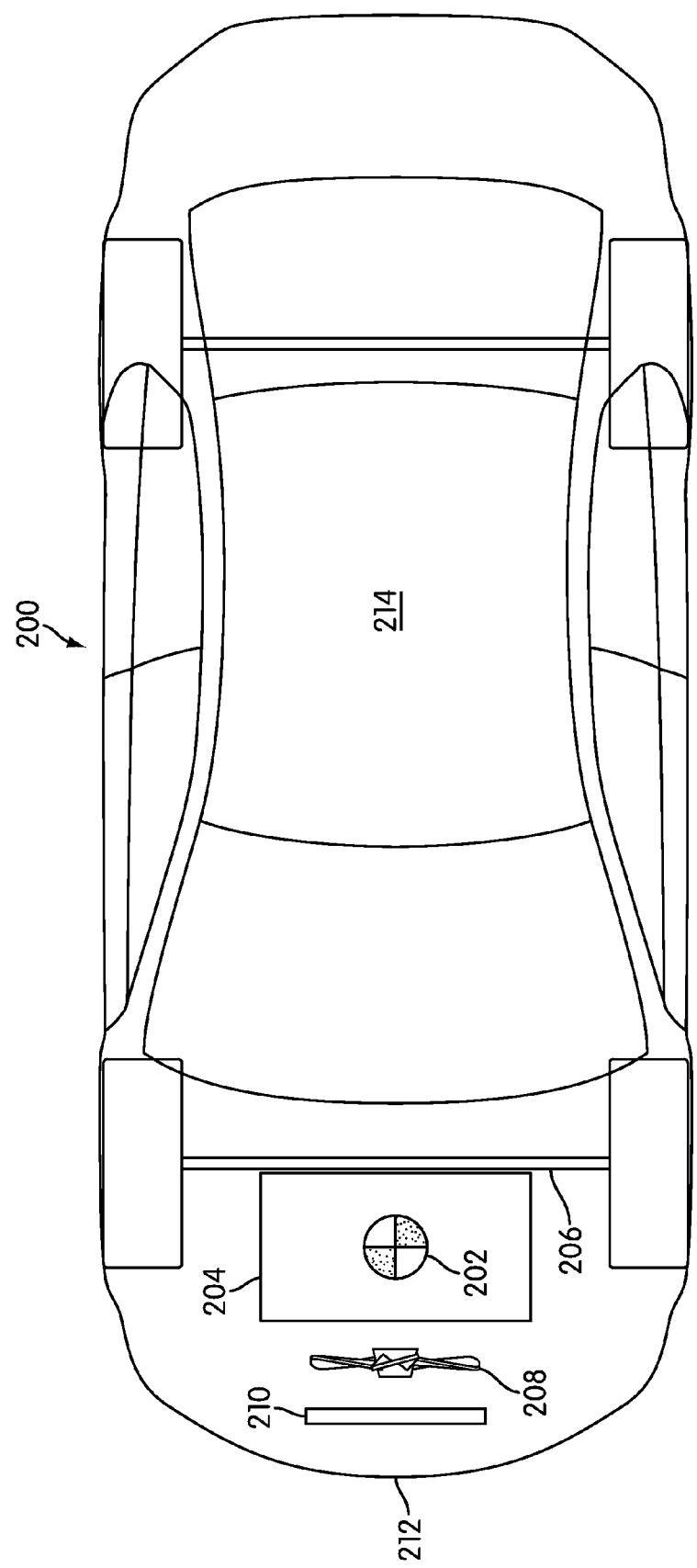
FIG. 2 is a schematic diagram of a top view of a preferred embodiment of a motor vehicle.
Figure 3:
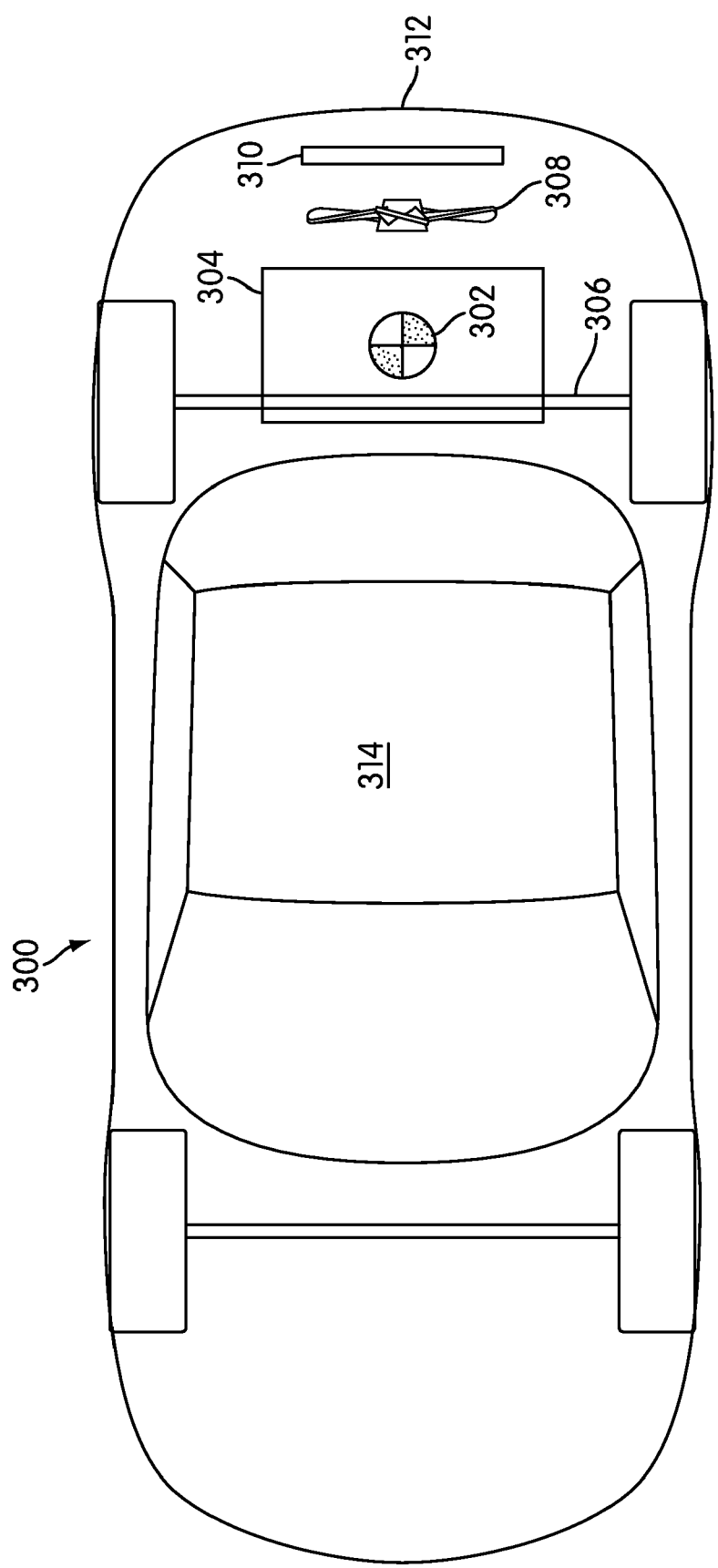
FIG. 3 is a schematic diagram of a top view of an alternative embodiment of a motor vehicle.
Figure 4:
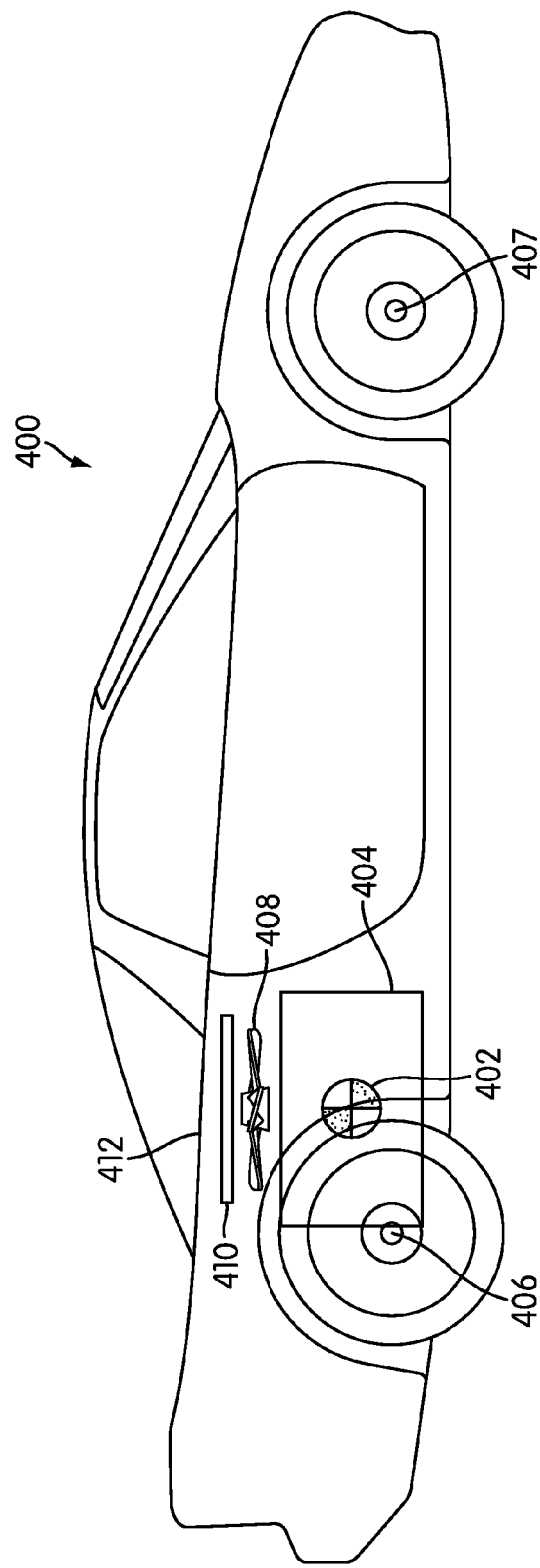
FIG. 4 is a schematic diagram of a side view of an alternative embodiment of a motor vehicle.

Principles and operation of the variable pitch radiator fan can be used in a number of different situations and in any kind of motor vehicle. FIGS. 2-4 are schematic diagrams of various configurations of motor vehicles. FIG. 2 is a schematic diagram of a front engine motor vehicle 200. In motor vehicle 200, the center of gravity or center of mass 202 of power plant 204 is disposed forward of front axle 206. Front engine motor vehicles 200 generally have engines 204 located forward of passenger cabin 214. As shown in FIG. 2, fan 208 is disposed between power plant 204 and radiator 110. Exterior surface 212 proximate to radiator 210 can also be observed in FIG. 2. In the embodiment shown in FIG. 2, exterior surface 212 is a front fascia or grille.

FIG. 3 is a schematic diagram of a rear engine motor vehicle 300. As shown in FIG. 3, center of gravity or center of mass 302 of engine 304 is disposed rearward of rear axle 306. Rear engine motor vehicles 300 generally have engines 304 that are located rearward of passenger cabin 314. Fan 308 is disposed between power plant 304 and radiator 310. Exterior surface 312 can be observed proximate to radiator 310. In some embodiments, exterior surface 312 of rear engine motor vehicle 300 can be a perforated rear trunk lid.

FIG. 4 is a schematic diagram of a mid engine motor vehicle 400. In a mid engine motor vehicle 400, the center of mass or center of gravity 402 of engine 404 is disposed between rear axle 406 and front axle 407. In some embodiments, mid engine motor vehicle 400 includes a fan 408 disposed vertically over or above power plant 404 and radiator 410 disposed above fan 408. Exterior surface 412 can be observed proximate to radiator 410. In some embodiments, exterior surface 412 of mid engine motor vehicle 400 can be an upper surface or deck lid of motor vehicle 400. In some embodiments, exterior surface 412 is perforated or louvered.

Figure 5:
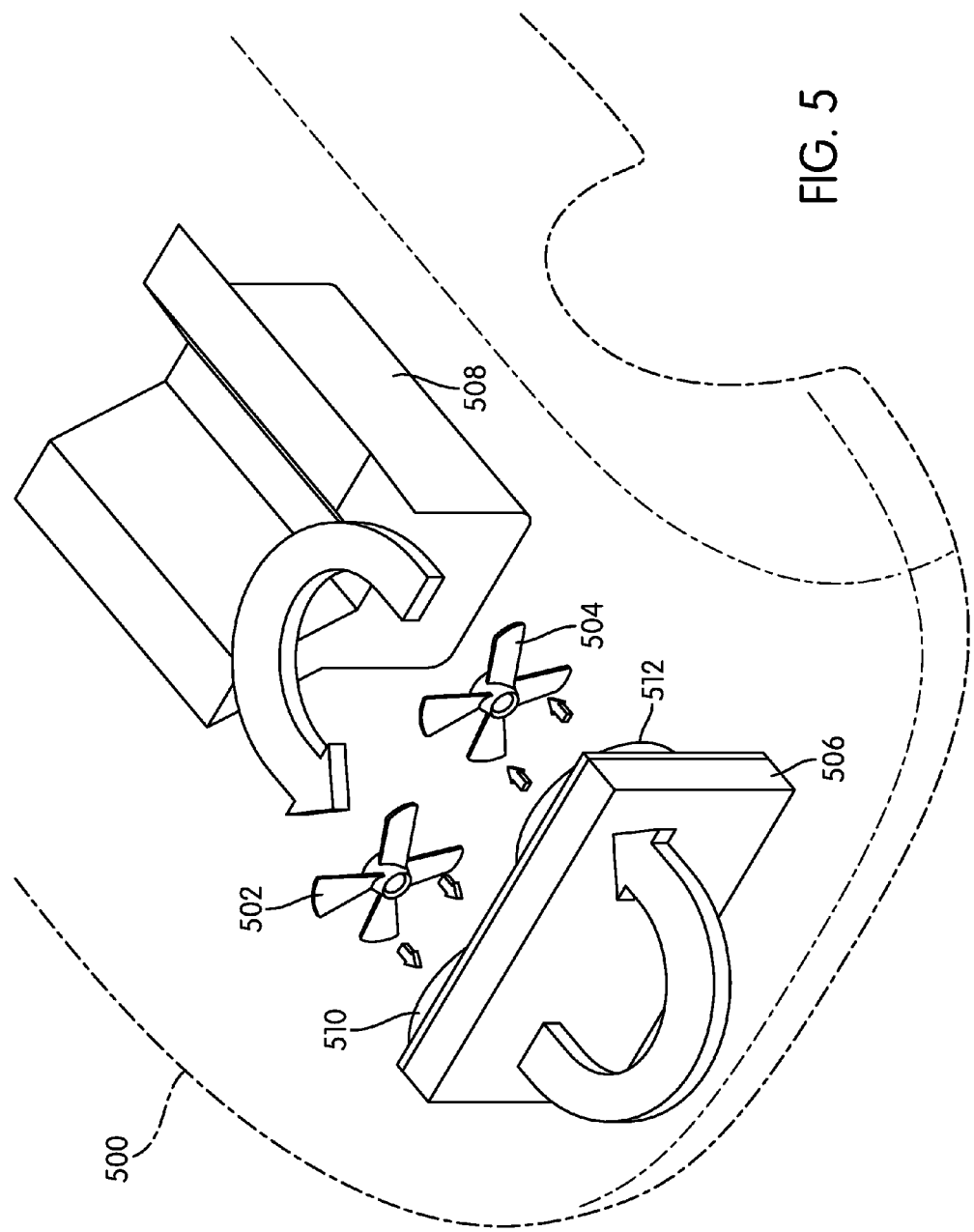
FIG. 5 is an exploded schematic diagram of a preferred embodiment of a portion of a motor vehicle.

FIG. 5 is an exploded schematic diagram of motor vehicle 500 with multiple fans. In the embodiment shown in FIGS. 5 and 6, motor vehicle 500 includes two fans, a first fan 502 and a second fan 504. Fans 502 and 504 are preferably disposed between radiator 506 and power plant 508. Some embodiments include optional shrouds or ducts associated with each fan. In the embodiment shown in FIG. 5, first fan 502 is associated with first shroud 510 and second fan 504 is associated with second shroud 512. First shroud 510 and second shroud 512 can be integrally formed as one unit and mounted to radiator 506. In other embodiments, first shroud 510 and second shroud 512 are mounted separately and independently.

In a preferred embodiment, first fan 502 and second fan 504 can be controlled so that first fan 502 operates in a manner that is different than second fan 504. In some cases, the operational differences include different fan speeds, in other cases, the operational differences include different blade pitch settings.

Figure 6:
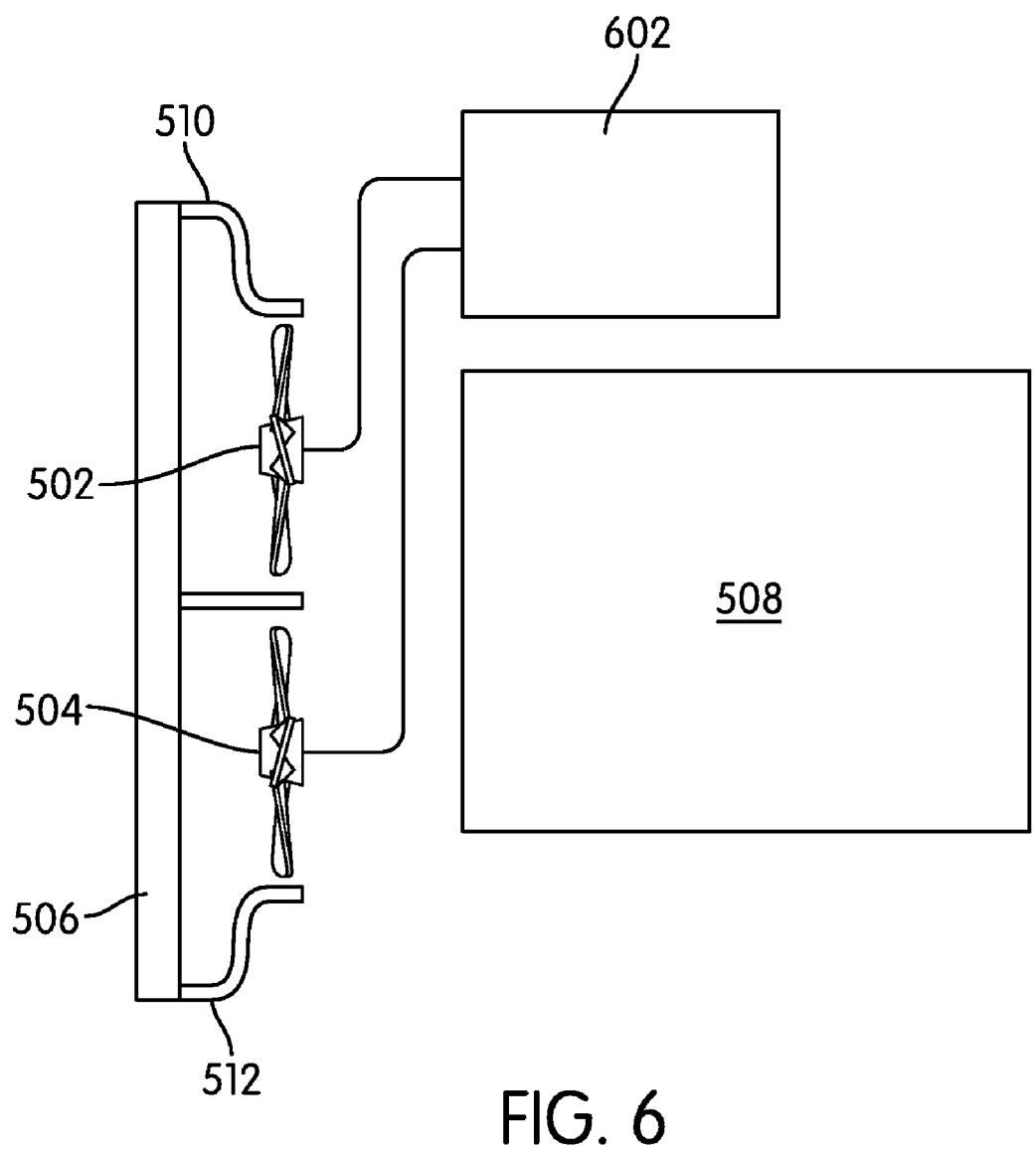
FIG. 6 is a schematic diagram of a preferred embodiment of a cooling system.

Referring to FIG. 6, which is a schematic diagram of a preferred embodiment of a multiple fan system, first fan 502 is in communication with control system 602, and second fan 504 is also in communication with control system 602. In the embodiment shown in FIG. 6, control system 602 is capable of controlling first fan 502 and second fan 504. Preferably, control system 602 can control the characteristics of each fan separately, and in some embodiments, control system 602 can independently control the characteristics of each fan.

In those embodiments where control system 602 can independently control each fan, control system can control the fan speed, the fan's flow characteristics, or both the fan speed and flow characteristics. Control system 602 can control the flow characteristics of each fan by controlling the blade pitch for that particular fan. In the embodiment shown in FIG. 6, control system 602 can control the rotational speed of first fan 502 as well as the blade pitch of first fan 502. Control system 602 can also control the rotational speed of second fan 504, as well as the blade pitch of second fan 504.

By separately controlling the characteristics of each fan, control system 602 can produce various kinds of flow fields. In one embodiment, control system 602 is able to produce a circulation flow as shown schematically in FIG. 5. This can be accomplished by altering the pitch of one of the fans. In the embodiment shown in FIG. 5, control system 602 as instructed first fan 502 to set a blade pitch where air flows from first fan 502 towards radiator 506 and second fan 504 has been instructed to set a blade pitch that is different than the blade pitch of first fan 502. In the embodiment shown in FIG. 5, the blade pitch of second fan 504 has been set to provide an air flow from radiator 506 towards second fan 504. This arrangement can create a circulation mode where air is drawn towards power plant 508 by second fan 504 and, at the same time, away from power plant 508 by first fan 502.

This circulation mode, where fans create air flow towards one side of power plant 508 and air flow away from power plant 508 on another side, can be used in a number of different circumstances. In some cases, the circulation mode is used when motor vehicle 500 is in an enclosed space with poor ventilation. An example of an enclosed space is a parking garage. In other cases, the circulation mode is used when certain temperature and humidity thresholds have been met. Preferably, control system 602 shown in FIG. 6 includes an arrangement of ports similar to control system 116 shown in FIG. 1. Both control system 116 shown in FIG. 1 and control system 602 shown in FIG. 6 can include a port that communicates or receives information from a humidity sensor. Control system 602 can use information from one or more temperature sensors, and optionally, information from a humidity sensor to determine if fans 502 and 504 should commence a circulation mode.

Other circulation modes can also be created by control system 602. In one example, the air flow directions of first fan 502 and second fan 504 could be reversed, thus creating a circulation of air that is generally clockwise, from the perspective shown in FIG. 6. Also, control system 602 can change the rotational speed or rotational direction of one or more fans to create the circulation mode.

Preferably, the circulation mode shown in FIG. 5 is only used when motor vehicle 500 is idling or traveling slowly. To prevent the commencement of the circulation mode when motor vehicle 500 is traveling at a speed above a certain threshold, control system 602 uses vehicle speed information obtained from a vehicle speed port to disengage or stop the operation of the circulation mode at a predetermined vehicle speed.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A motor vehicle comprising:
  a chassis;
  a passenger portion configured to receive at least one passenger;
  an exterior surface;
  a radiator disposed proximate the exterior surface, and in between the exterior surface and a fan;
  the fan including a hub and at least one fan blade, the fan blade being variable pitch and capable of assuming a plurality of different pitch angles;
  a pitch change mechanism configured to control the angle of the fan blade;
  a control system in communication with the pitch change mechanism; and
  wherein the control system receives vehicle speed and direction information related to vehicle speed and direction, and uses the vehicle speed and direction information to control the pitch change mechanism.

2. The motor vehicle according to claim 1, wherein when the control system receives vehicle direction information indicating that the vehicle is moving in a forward direction, the control system controls the pitch change mechanism to adjust the fan blade to assume a first pitch angle, and when the control system receives vehicle direction information indicating that the vehicle is moving in a reverse direction, the control system controls the pitch change mechanism to adjust the fan blade to assume a second pitch angle.

3. The motor vehicle according to claim 1, wherein when the control system receives vehicle speed and direction information indicating that the vehicle is going a first speed in a forward direction, the control system controls the pitch change mechanism to adjust the fan blade to assume a first pitch angle, and when the control system receives vehicle speed and direction information indicating that the vehicle is going a second speed in a reverse direction, the control system controls the pitch change mechanism to adjust the fan blade to assume a second pitch angle.

4. The motor vehicle according to claim 1, wherein the control system adjusts the pitch change mechanism to change a direction of the air flow as the vehicle changes direction.

5. The motor vehicle according to claim 1, wherein the control system adjusts the pitch change mechanism to provide air flow from the fan and towards the radiator when a motor vehicle speed is approximately zero.

6. The motor vehicle according to claim 5, wherein the control system adjusts the pitch change mechanism to change a direction of the air flow as vehicle speed increases.

7. The motor vehicle according to claim 5, wherein the control system adjusts the pitch change mechanism to provide air flow from the radiator towards the fan as the motor vehicle speed increases.

8. A motor vehicle, comprising:
a chassis;
a passenger portion configured to receive at least one passenger;
an exterior surface;
a radiator disposed proximate the exterior surface, the radiator also being disposed between the exterior surface and a fan;
a power plant disposed proximate the fan;
a coolant temperature sensor disposed proximate the radiator;
a first air temperature sensor disposed proximate the radiator;
a control system in communication with the first fan and the second fan; and
wherein the control system is configured to vary the blade pitch of the in response to signals the control system receives from the coolant temperature sensor and the first air temperature sensor.

9. The motor vehicle according to claim 8, wherein the coolant temperature sensor is disposed inside the radiator.

10. The motor vehicle according to claim 8, wherein the first air temperature sensor is disposed upstream from the radiator, the fan, and the power plant in a position between the exterior surface and the radiator.

11. The motor vehicle according to claim 8, wherein the first air temperature sensor is disposed downstream from the radiator and the fan and upstream from the power plant in a position between the fan and the power plant.

12. The motor vehicle according to claim 8, wherein the first air temperature sensor is disposed downstream from the radiator and upstream from the fan and the power plant in a position between the radiator and the fan.

13. A motor vehicle comprising:
a chassis;
a passenger portion configured to receive at least one passenger;
an exterior surface;
a radiator disposed proximate the exterior surface, and in between the exterior surface and a fan;
the fan including a hub and at least one fan blade, the fan blade being variable pitch and capable of assuming a plurality of different pitch angles;
a pitch change mechanism configured to control the angle of the fan blade;
a power plant disposed proximate the fan;
a control system in communication with the pitch change mechanism;
wherein the control system receives speed and direction information related to vehicle speed and direction, and uses the speed and direction information to control the pitch change mechanism;
wherein the control system receives air temperature information related to an air temperature proximate the radiator, and uses the air temperature information to control the pitch change mechanism; and
wherein the control system receives coolant temperature information related to a coolant temperature associated with the coolant inside the radiator, and uses the coolant temperature information to control the pitch change mechanism.

14. The motor vehicle according to claim 13, wherein an air temperature sensor is disposed upstream from the radiator, the fan and the power plant in a position between the exterior surface and the radiator, and wherein the control system receives air temperature information from the air temperature sensor.

15. The motor vehicle according to claim 13, wherein an air temperature sensor is disposed downstream from the radiator and the fan and upstream from the power plant in a position between the fan and the power plant, and wherein the control system receives air temperature information from the air temperature sensor.

16. The motor vehicle according to claim 13, wherein wherein an air temperature sensor is disposed downstream from the radiator and upstream from the fan and the power plant in a position between the radiator and the fan, and wherein the control system receives air temperature information from the air temperature sensor.

17. The motor vehicle according to claim 13, wherein a first air temperature sensor is disposed upstream from the radiator, the fan, and the power plant in a position between the exterior surface and the radiator, wherein a second air temperature sensor is disposed downstream from the radiator and the fan and upstream the power plant in a position between the fan and the power plant, and wherein the control system receives air temperature information from the first air temperature sensor and the second air temperature sensor.

18. The motor vehicle according to claim 13, wherein a first air temperature sensor is disposed upstream from the radiator, the fan, and the power plant in a position between the exterior surface and the radiator, wherein a second air temperature sensor is disposed downstream from the radiator and upstream from the fan and the power plant in a position between the radiator and the fan, and wherein the control system receives air temperature information from the first air temperature sensor and the second air temperature sensor.

19. The motor vehicle according to claim 13, wherein a first air temperature sensor is disposed upstream from the radiator, the fan, and the power plant in a position between the exterior surface and the radiator, wherein a second air temperature sensor is disposed downstream from the radiator and upstream from the fan and the power plant in a position between the radiator and the fan, wherein a third air temperature sensor is disposed downstream from the radiator and the fan and upstream the power plant in a position between the fan and the power plant, and wherein the control system receives air temperature information from the first air temperature sensor, the second air temperature sensor.

20. The motor vehicle according to claim 8, wherein the first air temperature sensor is disposed upstream from the radiator, the fan, and the power plant in a position between the exterior surface and the radiator and, wherein a second air temperature sensor is disposed downstream from the radiator and the fan and upstream from the power plant in a position between the fan and the power plant.

* * * * *